US007027836B2

(12) United States Patent
Zacks et al.

(10) Patent No.: US 7,027,836 B2
(45) Date of Patent: Apr. 11, 2006

(54) METHOD AND SYSTEM FOR ESTABLISHING A COMMUNICATION NETWORK

(75) Inventors: Carolyn A. Zacks, Rochester, NY (US); Michael J. Telek, Pittsford, NY (US); Frank Marino, Rochester, NY (US); Joseph A. Manico, Rochester, NY (US); Douglas B. Beaudet, Geneseo, NY (US); Dan Harel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 491 days.

(21) Appl. No.: 10/238,134

(22) Filed: Sep. 10, 2002

(65) Prior Publication Data

US 2004/0192383 A1   Sep. 30, 2004

(51) Int. Cl.
*H04M 1/00* (2006.01)
*H04B 1/38* (2006.01)

(52) U.S. Cl. ............. 455/557; 455/41.1; 455/41.3; 455/348; 455/419; 455/403; 455/456.1; 370/338; 379/142.06; 379/204; 235/380

(58) Field of Classification Search ............. 455/557, 455/456.1, 403, 419, 348, 41.1, 41.2, 41.3, 455/550, 519, 406, 434, 433; 235/380; 370/338; 379/142.06, 91.02; 711/122; 709/204; 713/182; 708/100; 345/156
See application file for complete search history.

(56) References Cited

U.S. PATENT DOCUMENTS

| | | | | |
|---|---|---|---|---|
| 5,241,641 A | * | 8/1993 | Iwasa et al. | 711/122 |
| 5,510,777 A | * | 4/1996 | Pilc et al. | 340/5.27 |
| 5,541,583 A | * | 7/1996 | Mandelbaum | 340/10.51 |
| 5,577,100 A | * | 11/1996 | McGregor et al. | 455/406 |
| 5,590,346 A | * | 12/1996 | West et al. | 455/348 |
| 5,631,947 A | * | 5/1997 | Wittstein et al. | 379/114.17 |
| 5,659,596 A | * | 8/1997 | Dunn | 455/456.1 |
| 5,748,720 A | * | 5/1998 | Loder | 455/406 |
| 5,796,827 A | * | 8/1998 | Coppersmith et al. | 713/182 |
| 5,812,641 A | * | 9/1998 | Kanoh et al. | 379/91.02 |
| 5,907,604 A | * | 5/1999 | Hsu | 379/142.06 |
| 5,914,701 A | * | 6/1999 | Gersheneld et al. | 345/156 |
| 5,953,425 A | * | 9/1999 | Selker | 713/185 |
| 6,028,853 A | * | 2/2000 | Haartsen | 370/338 |
| 6,049,813 A | * | 4/2000 | Danielson et al. | 708/100 |
| 6,104,913 A | * | 8/2000 | McAllister | 455/41.1 |
| 6,112,181 A | * | 8/2000 | Shear et al. | 705/1 |
| 6,164,531 A | * | 12/2000 | Harris et al. | 235/380 |

(Continued)

FOREIGN PATENT DOCUMENTS

CH    EP1024626    *    2/2000

(Continued)

OTHER PUBLICATIONS

Bluetooth—An Overview—Information from Johnson Consulting, Jun. 25, 2002, pp. 1-2, http://www.swedetrack.com/images/bluet04.htm.

(Continued)

*Primary Examiner*—William Trost
*Assistant Examiner*—Chuck Huynh
(74) *Attorney, Agent, or Firm*—Roland R. Schindler, II

(57) ABSTRACT

A communication device is provided having a transceiver adapted to send and receive wireless communication signals and a contact surface. A contact circuit is adapted to detect contact of another communication device with said contact surface. A controller is adapted to enable communication only between the communication device and detected communication devices.

43 Claims, 12 Drawing Sheets

U.S. PATENT DOCUMENTS

| | | | |
|---|---|---|---|
| 6,173,405 B1 * | 1/2001 | Nagel ....................... 713/200 |
| 6,211,799 B1 * | 4/2001 | Post et al. .................... 341/33 |
| 6,215,656 B1 * | 4/2001 | O'Neal et al. ............. 361/686 |
| 6,256,509 B1 * | 7/2001 | Tanaka et al. .............. 455/515 |
| 6,437,745 B1 * | 8/2002 | Vaisanen et al. ........... 343/702 |
| 6,461,193 B1 * | 10/2002 | Matthies ..................... 439/509 |
| 6,496,851 B1 * | 12/2002 | Morris et al. ............... 709/204 |
| 6,518,993 B1 * | 2/2003 | Kerai et al. .............. 348/14.01 |
| 6,542,092 B1 * | 4/2003 | Pan .............................. 341/26 |
| 6,553,228 B1 * | 4/2003 | Kotzin ....................... 455/434 |
| 6,625,423 B1 * | 9/2003 | Wang ........................ 455/74.1 |
| 6,668,167 B1 * | 12/2003 | McDowell et al. ......... 455/433 |
| 6,735,435 B1 * | 5/2004 | Newell et al. .............. 455/419 |
| 6,816,719 B1 * | 11/2004 | Heinonen et al. ........... 455/403 |
| 6,829,487 B1 * | 12/2004 | Eiden et al. ................ 455/519 |
| 6,892,052 B1 * | 5/2005 | Kotola et al. .............. 455/41.2 |
| 2001/0022780 A1 | 9/2001 | Mizutani et al. |
| 2002/0006806 A1 * | 1/2002 | Kinnunen et al. .......... 455/550 |
| 2004/0097274 A1 * | 5/2004 | Schlegel .................. 455/569.2 |

FOREIGN PATENT DOCUMENTS

| | | |
|---|---|---|
| EP | 1 024 626 A1 | 8/2000 |
| EP | 1 033 876 A1 | 9/2000 |
| EP | 1 109 382 A2 | 6/2001 |
| FI | EP1109382 * | 6/2001 |
| GB | 2288300 A | 11/1995 |
| JP | 09093567 | 4/1997 |
| JP | 10145637 | 5/1998 |
| JP | EP1033876 * | 6/2000 |

OTHER PUBLICATIONS

Bluetooth—An Overview—Information from Johnson Consulting, Jun. 25, 2002, pp. 1-2, http://www.swedetrack.com/images/bluet13.htm.

Bluetooth—An Overview, Information from Johnson Consulting, Jun. 25, 2002, pp. 1-2, http://www.swedetrack.com/images/bluet14.htm.

Wireless Pictures—Part of a New Technology, pp. 1-4, http://www.kodak.com/US/en/corp/researchDevelopment/technologyFeatures/wireless.shtml, Jul. 8, 2002.

WhitePaper, Bluetooth Technology Overview, Commercial Portables Product Marketing, Nov. 2000, pp. 1-25.

Claire Tristram, Hand-Helds of Tomorrow, Technology Review Apr. 2002, pp. 35-40.

T.G. Zimmerman, Personal Area Networks:Near-field intrabody communication, IBM Systems Journal, vol. 35, Nos. 3&4, 1996, pp. 609-617.

IBM, User System Ergonomics Research, Almaden Research Center, Pan Fact Sheet, Nov. 18-19, 1996, one page.

Stephen Shankland, CNET News.com, Gates Touts Vision of PC as hub, Apr. 19, 2002, http://news.zdnet.co.uk/story/O,,t294-s2108764,00.html.

* cited by examiner

METHOD AND SYSTEM FOR ESTABLISHING A COMMUNICATION NETWORK

CROSS REFERENCE TO RELATED APPLICATIONS

Reference is made to commonly assigned and co-pending U.S. patent application Ser. No. 09/337,240, entitled WIRELESS COMMUNICATION SYSTEM FOR TRANSMITTING IMAGES FROM AN ENABLED ELECTRONIC CAMERA TO RECEIVER, filed in the name of Manico et al. on Jun. 22, 1999.

FIELD OF THE INVENTION

The invention relates to wireless communication systems and in particular, to a method for establishing an ad hoc network between two or more communication devices.

BACKGROUND OF THE INVENTION

While out socializing with a group, it is rare to have total agreement amongst its members as to which activities the members of the group are to be involved in. Often, smaller groups based on interests form. These smaller groups are typically short lived and exist only for the duration of an event such as a visit to an amusement park or sporting event. The members of such groups often wish to be able to communicate exclusively with the members of the small group during the event.

Various communication systems and devices exist that permit the formation of a network of wireless communication devices. Cellular telephones, two way pagers, and wireless personal digital assistants can be used to permit communications between members of a group. However, using such existing devices, it is often very difficult to establish, maintain, use and terminate an ad-hoc network.

For example, the user of a cellular telephone can create an ad hoc network by obtaining phone numbers for other cellular telephones and arranging for a three way or conference call. However, such a network cannot be established rapidly. Further such a network requires that the permanent identification numbers that are associated with each phone be shared with others. This permits anyone who has access to the identification number to attempt to call the holder of the phone. Thus, many users of cellular telephones are reluctant to share their telephone numbers with others with whom they may have only an ad hoc need to communicate.

It is also known to provide video cameras and monitors that communicate in a wireless fashion using multiple channels and code encryption to reduce the possibility of signal confusion and unauthorized monitoring of the channel. For example, in JP10145637 what is shown is a video camera and monitor that are adapted to exchange video in a wireless fashion. Before installation of the camera, the camera and monitor are joined by a wire connector and identification codes are exchanged. The use of the wire connection to exchange codes eliminates the risk of interception of the codes that is associated with exchanging the codes wirelessly. This exchange of identification codes however, can be tedious to execute where multiple devices must be registered for mutual communication.

Alternatively, other types of communication devices such as the Talkabout (R) system sold by Motorola Corporation Schaumburg, Ill. provide simple access to one or more open communication channels. Any number of members can form a network on such a channel. Communications are encoded using one of a plurality of predefined codes. Each user in a network selects the same channel/code combination. Access to communications is restricted because each device has multiple communication channels with multiple codes that can be used. This makes it unlikely that a surreptitious listener will obtain the proper channel and code combination to listen to a particular communication. This method too can be inconvenient to execute because each member of the group must manually adjust for channel and code.

Other known wireless specifications and formats such as for example, the Bluetooth standard that is based upon Institute of Electrical and Electronics Engineers standard 802.11b permit the formation of ad hoc networks. Bluetooth requires that a low-cost digital radio frequency transceiver chip be included in each communication device to be used in a network. Each device has a unique 48-bit address. Using the unique 48-bit address, connections between communication devices can be quickly made. Such connections can be in a point-to-point or multi-point fashion. Bluetooth provides secure communications using a scheme of public and private encryption keys. Bluetooth devices have a communication range of about 10 meters. Each Bluetooth device uses an inquiry procedure to discover which other Bluetooth enabled communication devices are in range and to determine the addresses for the devices. The inquiry procedure involves a unit sending out inquiry packets. If another unit that is in range is in an appropriate state to receive the inquiry packets, the other unit will enter an inquiry response state and send an inquiry reply to the source. After the inquiry procedure has completed, a connection can be established using a paging procedure. It will be appreciated that using such a system requires a continual cycle of inquiries and responses. Such a system creates difficulties in that it allows for unwanted connections to be formed. These unwanted connections must be filtered out or otherwise sorted. It can be difficult for a novice user to separate desirable connections from undesirable connections.

Thus, what is needed is an apparatus and a method for establishing an ad hoc network in a rapid and effective fashion. There is a further need for an apparatus and method that permits a user to privately communicate with members of an ad-hoc network in a simple and easy to understand manner.

SUMMARY OF THE INVENTION

A communication device is provided having a transceiver adapted to send and receive wireless communication signals and a contact surface. A contact circuit is adapted to detect contact of another communication device with said contact surface. A controller is adapted to enable communication only between the communication device and detected communication devices.

In another aspect what is provided is a communication system. The communication system has at least two communication devices. Each communication device has a transceiver adapted to send and receive information using radio frequency signals said transceiver having an address, a camera to capture images, and a display adapted images. Each communication device also has a contact surface adapted to detect contact between the contact surface of the communication device and a contact surface of another of the at least two communication devices; and a controller adapted to determine an address list containing the address of each transceiver of each detected communication device.

Each controller is operable to enable communication only with communication devices having an address on the address list.

In a further aspect what is provided is a method for forming a wireless communication network between at least two communication devices each having a contact surface. In accordance with the method, the contact surface of one communication device is moved into contact with the contact surface of at least one other communication device. Contact between the contact surfaces are registered. Communication between communication devices is limited to communication between communication devices having registered contact.

DETAILED DESCRIPTION OF THE INVENTION

Figure 1:
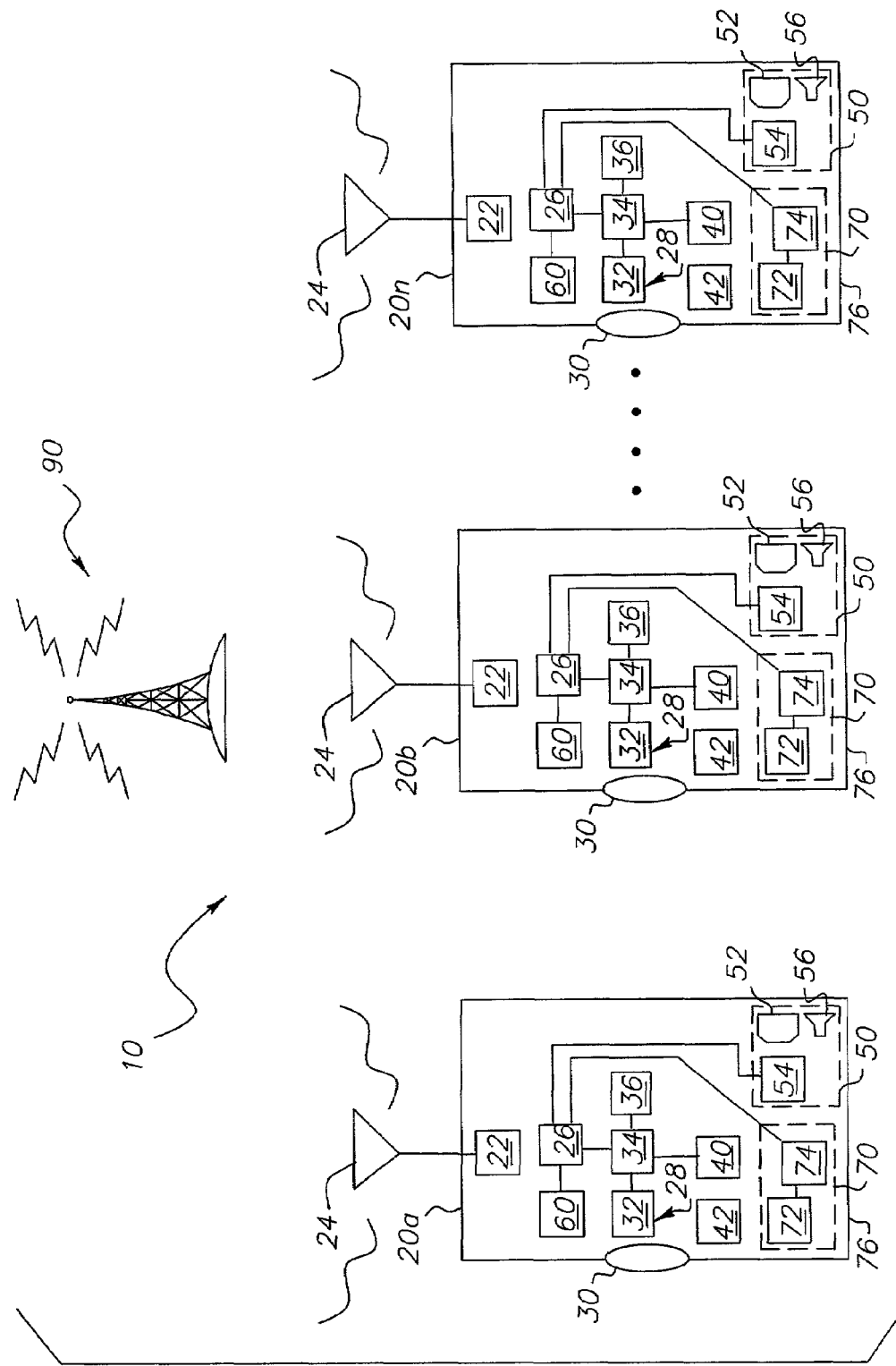
FIG. 1 shows one embodiment of a communication system in accordance with the present invention.

Turning now to FIG. 1, a block diagram of a simple embodiment of a communication system 10 is shown. In this embodiment, a plurality of like communication devices 20a–20n are provided. Each of the communication devices 20a–20n has a radio transceiver 22 and antenna 24. Radio transceiver 22 is adapted to transmit and receive radio frequency signals carrying digital data containing text, audio and video communications. In one useful embodiment, radio transceiver 22 is adapted to communicate using the high rate consumer wireless communication standard defined in Institute of Electrical and Electronic Engineers standard IEEE 802.15.3. In other embodiments radio transceiver 22, can be adapted to communicate using the standards set forth in Institute of Electrical and Electronic Engineers standard IEEE 802.11b. Alternatively, radio transceiver 22 can employ any useful radio frequency communication scheme to send and receive data. Radio transceiver 22 can be adapted to transmit communication signals directly to others of communication devices 20a–20n. Alternatively, radio transceiver 22 can transmit signals to other communication devices by way of a separate intermediary communication site 90 such as, for example, a cellular tower, satellite, wireless repeater, or by way of other communication devices.

Radio transceiver 22 is also adapted to cooperate with antenna 24 frequency data is converted into digital data. The digital data is transferred to controller 26 and converted into digital data.

Each one of communication devices 20a–20n comprises a controller 26. Controller 26 can comprise, for example, a general-purpose programmable microprocessor such as a Pentium microprocessor sold by Intel Corp. of San Jose, Calif. a microcontroller, or other similar control device adapted to control the operation of the communication device 20 in which it is installed. In the embodiment shown, controller 26 is adapted to prepare data representing the content of communications to convey the data to radio transceiver 22 and to cause radio transceiver 22 to transmit data. In addition, controller 26 is adapted to receive signals containing data from radio transceiver 22 and to process this data for use as described herein. Further each controller 26 controls the operation of the communication device in which it is installed.

In the embodiment of FIG. 1, each one of communication devices 20a–20n incorporates a video communication system 28. Video communication system 28 comprises a lens system 30, image sensor 32, image processor 34, memory 36, display driver 40 and video display 42. Images are captured by passing light from a scene through lens system 30. This light is focused on image sensor 32. Image sensor 32 forms an electronic signal that is representative of the light that is focused on image sensor 32. Image sensor 32 can take on a variety of forms. For example, charge coupled devices can be used, as can complementary metal oxide based sensors and charge injection devices. Other imaging technologies can also be used for image sensor 32. Images that are captured by image sensor 32 are transmitted as electronic signals to an image processor 34. Image processor 34 is adapted to receive electronic signals from image sensor 32 and to convert the electronic signal into digital data representing the image captured by image sensor 32. The digital data representing the image can then be transferred to a memory 36 which can comprise a semiconductor memory such as a Flash Memory or other form of Random Access Memory, a magnetic memory such as a disk drive or an optical memory such as a compact disk or digital video disk. The digital data representing the image can also be transmitted to a display driver 40 which converts the digital data into signals that cause a video display 42 such as a liquid crystal display or organic light emitting display to present the captured image to the user. Digital data representing the image can also be provided to radio transceiver 22. Radio transceiver 22 converts the digital data into a digital radio frequency signal which is transmitted using antenna 24.

Radio transceiver 22 also receives digital radio frequency signals from other of communication devices 20a–20n containing digital video data by way of antenna 24. The digital radio frequency data is converted into digital data. The digital data is transferred to controller 26 and converted into digital image data. The digital image data is transferred to display driver 40 and converted into images that are viewable on video display 42.

Video communication system 28 can also be used for displaying content other than captured images. For example, controller 26 can use video communication system 28 to present icons and text images on video display 42 that indicate the status of the communication device. Video communication system 28 can also be used to also display the content of communications such as text and iconic messages received from other of communication devices 20*a*–20*n*.

One or more of the components of video communication system 28 can be integrated onto a single silicon substrate. For example, image sensor 32 can be formed on a semiconductor having a "camera on chip" type architecture wherein a single semiconductor substrate provides structures to perform image sensing, image processing, image storage functions. One example of such a camera on a chip is the OVT7635 Camera Chip™ sold by Omnivision Technologies of Santa Clara, Calif., U.S.A. An alternative example of a camera-on-a-chip architecture found in the COACH LC and COACH II image processors sold by Zoran Corp. of Santa Clara, Calif., U.S.A., which incorporate image processing, memory, memory management, display control and other functions on a single substrate. In this way, the cost and complexity of communication devices 20*a*–20*n* can be reduced.

Each of communication devices 20*a*–20*n* also has an audio system 50 that is adapted to capture and generate audio signals. In the embodiment shown, sound input is entered by way of microphone 52. Microphone 52 converts acoustical energy from the sound input into an electronic signal. This electronic signal is transmitted to A/D converter 54 that renders digital signals representing the sound. Controller 26 receives the digital signals representing the sound. Controller 26 processes these signals for storage in memory 36 or for use by radio transceiver 22.

Radio frequency signals containing audio data are received by radio transceiver 22. Radio transceiver 22 extracts digital data from radio frequency signals and provides this digital data to controller 26. As will be discussed in greater detail below, controller 26 processes this data if necessary and provides a stream of digital audio data to A/D converter 54. A/D converter 54 converts the data into an analog signal that is provided to speaker 56 which in turn converts the analog signal into acoustical energy.

Communication devices 20*a*–20*n* each have a user interface 60 that permits a user to encode numbers, text, and other forms of communication into electronic signals that are transmitted to controller 26. Controller 26 converts these electronic signals into digital data which can then be used to control the operation of the communication device, transmitted using radio transceiver 22, stored in memory 36 and/or displayed on display driver 40.

Communication devices 20*a*–20*n* each have a contact detection system 70 with a contact surface 72 and a contact circuit 74. Each contact circuit 74 registers contact between the contact surface 72 of one of communication devices 20*a*–20*n* and the contact surface 72 of at least one other one of communication devices 20*a*–20*n*. When such contact is registered, each contact circuit 74 transmits a signal to its respective controller 26 indicating that such contact has been made. Each controller 26 then defines at least one mode of operation in which the processor communicates only with the set of communication devices 20*a*–20*n* with which the contact surface 72 has had contact. A user of communication device 20*a* or communication device 20*b* can select this ad hoc network mode of communication using for example, user interface 60. User interface 60 comprises any known transducer for converting a user action into a signal that can be transmitted to controller 26. Examples of such a transducer include a switch, dial, stylus, mouse, joy stick, potentiometer, visible or non-visible light sensor or imager. User interface 60 can also have transducers that convert instructions into signals that can be interpreted by controller 26. User interface 60 can be combined with display 42 in the form of a touch screen or like device.

Contact circuit 74 can detect contact between a contact surface 72 to which it is connected and another contact surface of another communication device in a variety of ways. For example, where contact surface 72 and the other contact surface are electrically conductive, each contact circuit 74 can cause an electro-magnetic field to form on contact surface 72. When contact surface 72 is in contact with another contact surface, the electromagnetic fields combine. By monitoring the intensity, waveform, or signal content on each contact surface 72 each contact circuit 74 can detect when contact surface 72 is in contact with another contact surface. Other electromagnetic methods for detecting contact can be used. For example, contact between two contact surfaces can be detected by noting variations in capacitance, electrostatic charge, and/or inductance at the contact surface. Electro-mechanical structures can also be used to register contact between two contact surfaces, such as vibrational, sonic or ultra sonic signal generators and detectors. Electro-optical detection structures can also be used, for example, when a contact surface 72 of, for example, communication device 20*a* is brought into contact with a contact surface 72 of second communication device, e.g., 20*b*, the contact surfaces can be mechanically moved, deflected and/or otherwise mechanically changed. In this example, contact circuit 74 determines these changes and causes a particular light to emit. Contact circuit 74 detects light of the type emitted in response to contact and determines that contact has been made with another communication device.

In one embodiment, a network identification signal is used to regulate communication between contacted communication devices. In this embodiment, when contact is registered between the contact circuit 74 of communication device 20*a* and the contact surface 72 of communication device 20*b*, the controller 26 of communication device 20*a* and the controller 26 of communication device 20*b* determine a network identification signal that is used to designate communications that are intended for exchange between communication device 20*a* and communication device 20*b*. The network identification signal can comprise any mutually agreed upon signal. Conveniently the user identification signal can comprise or be derived from user identifications such as a user name or user identification image. When the user of, for example, communication device 20*a* wishes to communicate with the user of communication device 20*b*, the user places communication device 20*a* in the ad hoc network communication mode. The user of communication device 20*a* then captures data, voice, or a video signal, which is processed by controller 26 and converted into a signal that is transmitted to radio transceiver 22. This signal includes the network identification signal. The signal received by radio transceiver 22 of communication device 20*a* is then converted into a broadcast signal and transmitted using antenna 24 of communication device 20*a*.

In this example, antenna 24 of communication device 20*b* receives broadcast signals and provides them to radio transceiver 22 of communication device 20*b*. Radio transceiver 22 converts the broadcast signals into digital data that is transmitted to controller 26. Controller 26 scans the digital data generated by radio transceiver 22 in response to each broadcast signal to identify the presence of a network identification signal. Where a network identification signal is identified in the digital data that is not known to controller 26, controller 26 ignores the broadcast signal. Where the digital data contains a network identification signal that is known to controller 26, controller 26 decodes the digital data and provides signals to video communication system 28 and/or audio communication system 50 which, generate audio and video signals representative of the content of the communication broadcast by communication device 20*a*. Signals that are transmitted without an associated network identification signal are presumed to be public in nature.

Communication device 20*b* can have a controller 26 that ignores communications that are transmitted without a network identification signal. Alternatively, communication device 20*b* can have a controller 26 that is operative in a mode that renders output based on the communications that are transmitted with and without a network identification signal. In the embodiment shown, communication device 20*b* has a controller 26 that is selectively operable in both the mode of ignoring communications that are transmitted with a network identification signal and the mode of rendering an output based on communications that are transmitted without a network identification signal. In another embodiment, the network identification signal can also be used as an encryption code to prevent surreptitious interception of communications transmitted using the network identification signal.

In another other embodiment, communication devices 20*a*–20*n* are adapted to communicate using a wireless local area network communication scheme such as Bluetooth. As is noted above, using Bluetooth each radio transceiver 22 has a unique 48-bit address. Connections between individual devices are formed using the 48-bit address. Ad-hoc networks can be formed between sets of individual devices by compiling a list of all addresses and limiting networked communications to the devices on the list. As is also noted above, each Bluetooth enabled device continually scans all of the devices within its communication range to obtain addresses for potential use in future communications. When used at an event such as a baseball game or soccer game, with thousands of fans located in relatively close proximity, this approach could potentially garner hundreds of addresses from other devices that are within range. Sorting through the list of available devices to define an address list becomes particularly difficult under such circumstances.

In this embodiment, the set of communication devices 20*a*–20*n* to be included in the ad hoc network are identified on the basis of registered contact between the communication devices. When each of communication devices 20*a*–20*n* registers contact with another communication device, controller 26 of each communication device adds the address of the other communication device to a list of addresses. Ad hoc communications are enabled by limiting distribution of all communication using the ad hoc network to those devices whose 48-bit address is contained within the distribution list.

Figure 2:
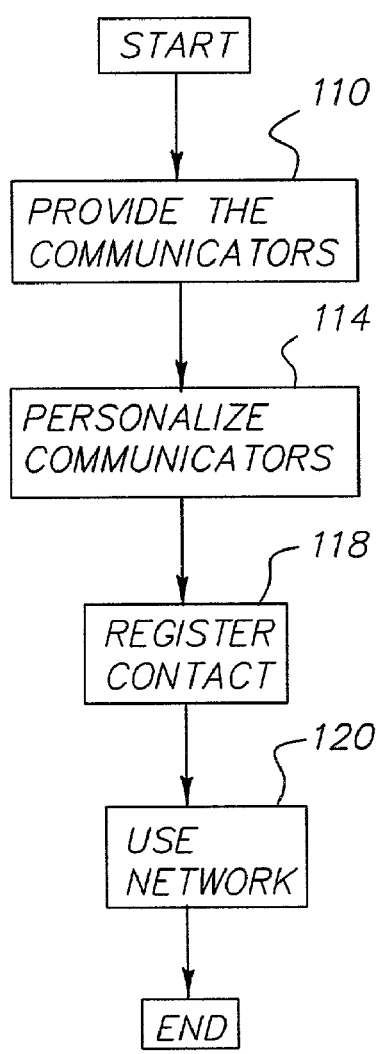
FIG. 2 shows a block diagram of a method for forming an ad hoc network in accordance with the present invention.
Figure 3:
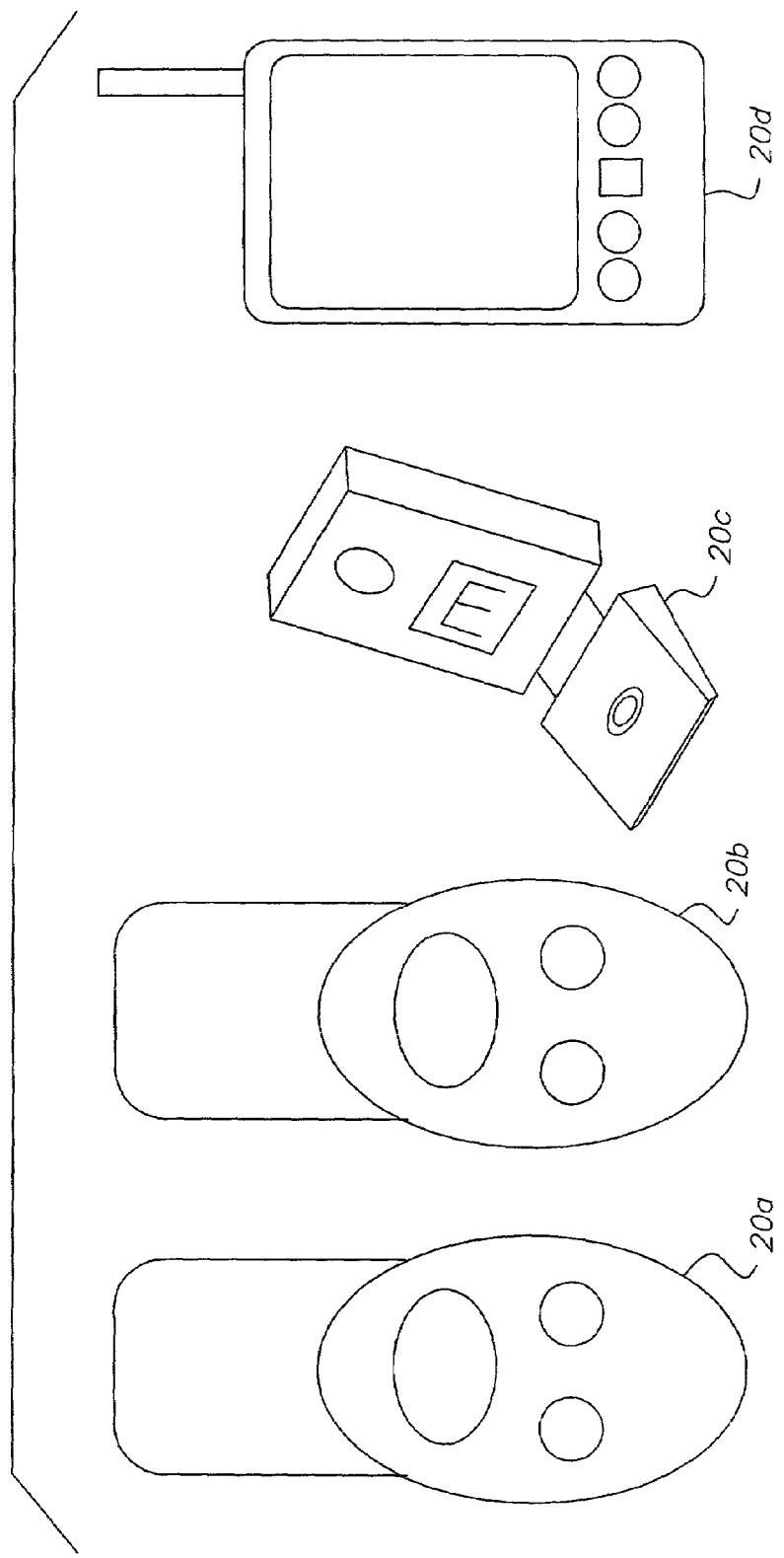
FIG. 3 illustrates various embodiments of communication devices of the present invention.

FIG. 2 shows a block diagram of one embodiment of a method for establishing an ad hoc communication network using communication devices 20*a*–20*d*. In a first step, a set of communication devices is provided (step 110). There are various ways that this can be done. For example, a group of four takes a trip to the zoo. Two members of the group rent communication devices 20*a* and 20*b* at the zoo. The two other members of the group own their own personal communication devices shown in FIG. 3 as communication devices 20*c* and 2*d*. Communication device 20*c* is, for example, incorporated into a cellular telephone while communication device 20*d* takes the form of a personal digital assistant. Both of communication devices 20*c* and 20*d* are capable of operating in a conventional mode of communications associated with the device such as using, for example, normal cellular telephone technology in the case of communication device 20*c* and a mode for communication using PDA type communications in the case of communication device 20*d*. Each of communication devices 20*c* and 20*d* is also capable of operating in a mode of communication using an ad hoc network.

Figure 4:
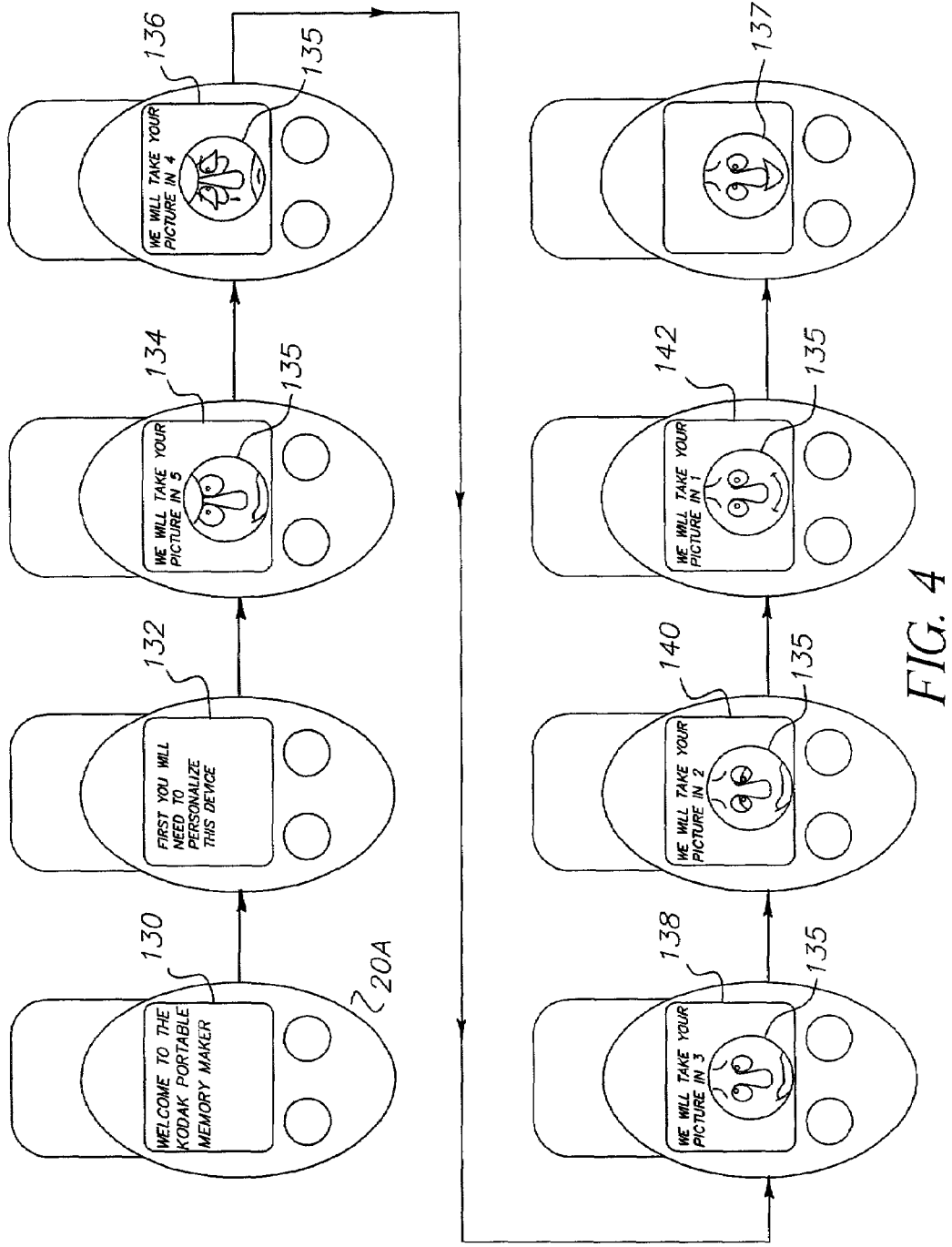
FIG. 4 illustrates one embodiment of a device personalization process.

Each communication device is personalized (step 114). This can be done in various ways. FIG. 4 shows an illustration of the sequence of communication device provided instructions that can be used to personalize a communication device such as communication device 20*a*. In the embodiment shown in FIG. 4, communication device 20*a* provides a welcome message 130 and then provides an instruction message 132 indicating that the personalization process is to be performed. In the embodiment shown, personalization is performed by capturing an image of the user of communication device 20*a*. A sequence of messages 134, 136, 138, 140, and 142 are presented to the user to indicate the countdown sequence before the image of the user will be captured. As is shown in FIG. 4, as the countdown begins, a preview image of the user 135 is captured and presented under the sequence of messages so that the user can properly arrange user identification image 137 to be used to represent the user. This image of course does not need to be an image of the user. Instead, the image can be an image of something representative of the user such as a favored article of clothing or favored photographic subject. Alternatively, a user can enter other personalization items such as a name, symbol, or other visible marking to represent the user of the device. In another alternative, a user identification image or symbol can be obtained from an external source or device such as an external camera system, a ring or other type of personal article having a memory capable of providing an identification signal and/or any other form of electronic memory such as a compact flash card or electronic memory. As will be described in greater detail below, the personalization step can also include entering a user profile.

In one embodiment a user profile can also be determined in advance of the personalization step and stored in memory. The user profile information can then be extracted from memory. In another embodiment, the personalization step can be omitted. Where this is done, default profile information can be used with each communication providing a unique identifier.

In any embodiment, a communication device such as communication device 20*a* can have a controller 26 that is adapted to modify the user profile based upon the user's actual usage of the device to adapt the user profile so that the communication device 20*a* to match actual usage patterns.

Figure 5:
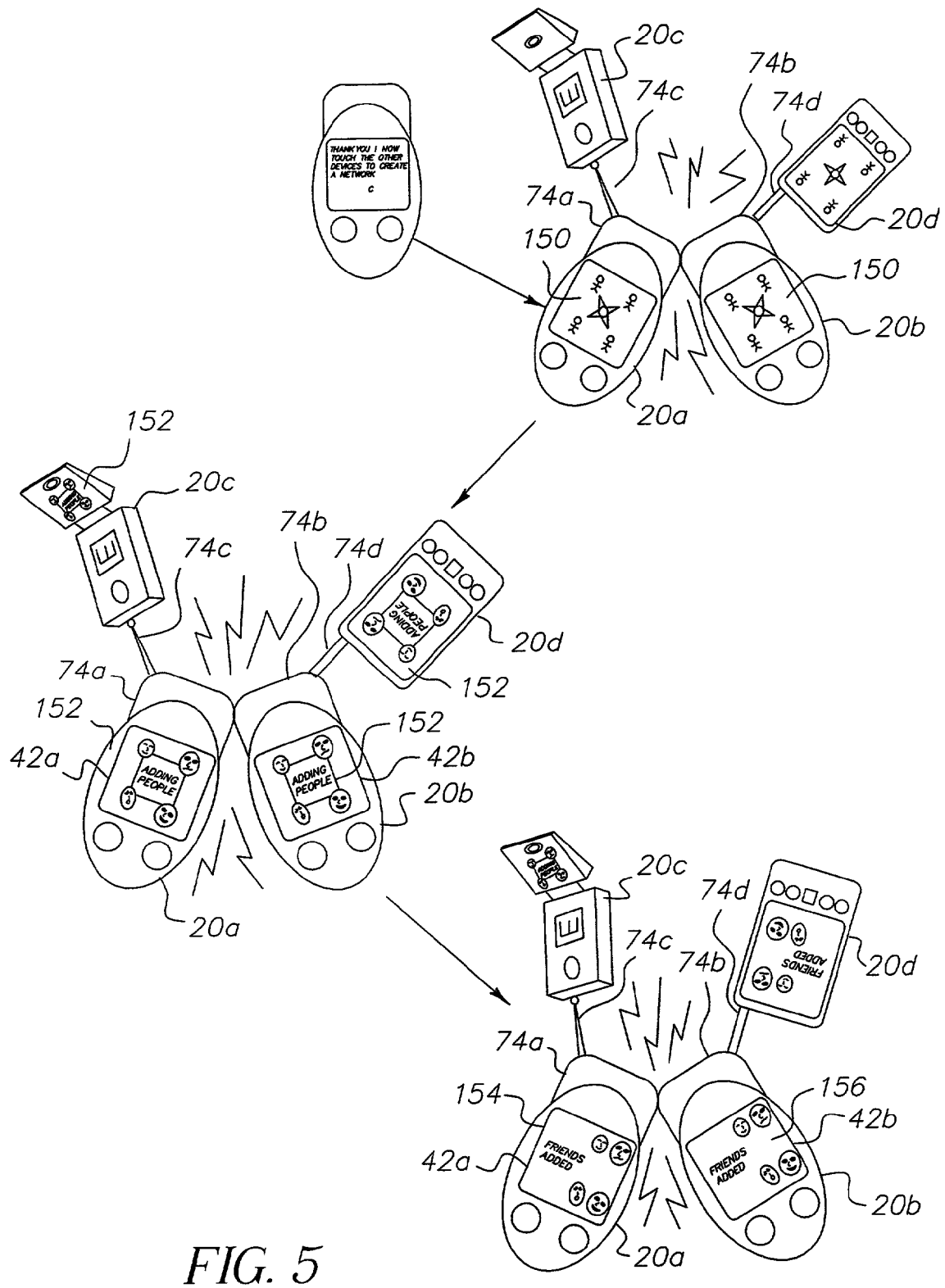
FIG. 5 illustrates one embodiment of a network formation step.

As shown in FIG. 5, each communication device 20*a*–20*d* incorporates a contact surface 74*a*, 74*b*, 74*c* and 74*d* respectively. To form an ad hoc network between communication devices 20*a*, 20*b*, 20*c* and 20*d*, the contact surfaces 74*a*, 74*b*, 74*c* and 74*d* are brought into contact for example, in the manner shown in FIG. 5. Each communication device 20*a*, 20*b*, 20*c* and 20*d* is adapted to provide feedback during this process. For example, audiovisual feedback can be provided to indicate that a successful connection has been made between two or more devices, that a contract registration process is successfully progressing, and when a network has been successfully formed—(step 118).

FIG. 5 also shows an example of such video feedback. As shown in FIG. 5, a first feedback image 150 is provided on each communication device in response to contact between contact surfaces 74*a*, 74*b*, 74*c*, and 74*d*. As registration occurs, a progress indicator 152 is provided on each of video screens 42*a*, 42*b*, 42*c* and 42*d*. When the contract registration process is complete, each communication device provides an image 154 indicating successful completion of the formation of a network. In the embodiment shown, image 154 preferably incorporates each of the user identification images, symbols and/or text associated with each user of communication device from the users profile for external communication that has registered contact with communication device 20*a*. It will be appreciated that in certain circumstances the step of personalization can be omitted. Where this is done default identification and preferences can be used. This provides a positive feedback to ensure that the users of communication devices 20*a*–20*d* will know who is in the ad hoc network formed by this registration process and, therefore, they can make corrections as necessary to composition of the ad hoc network.

Figure 6:
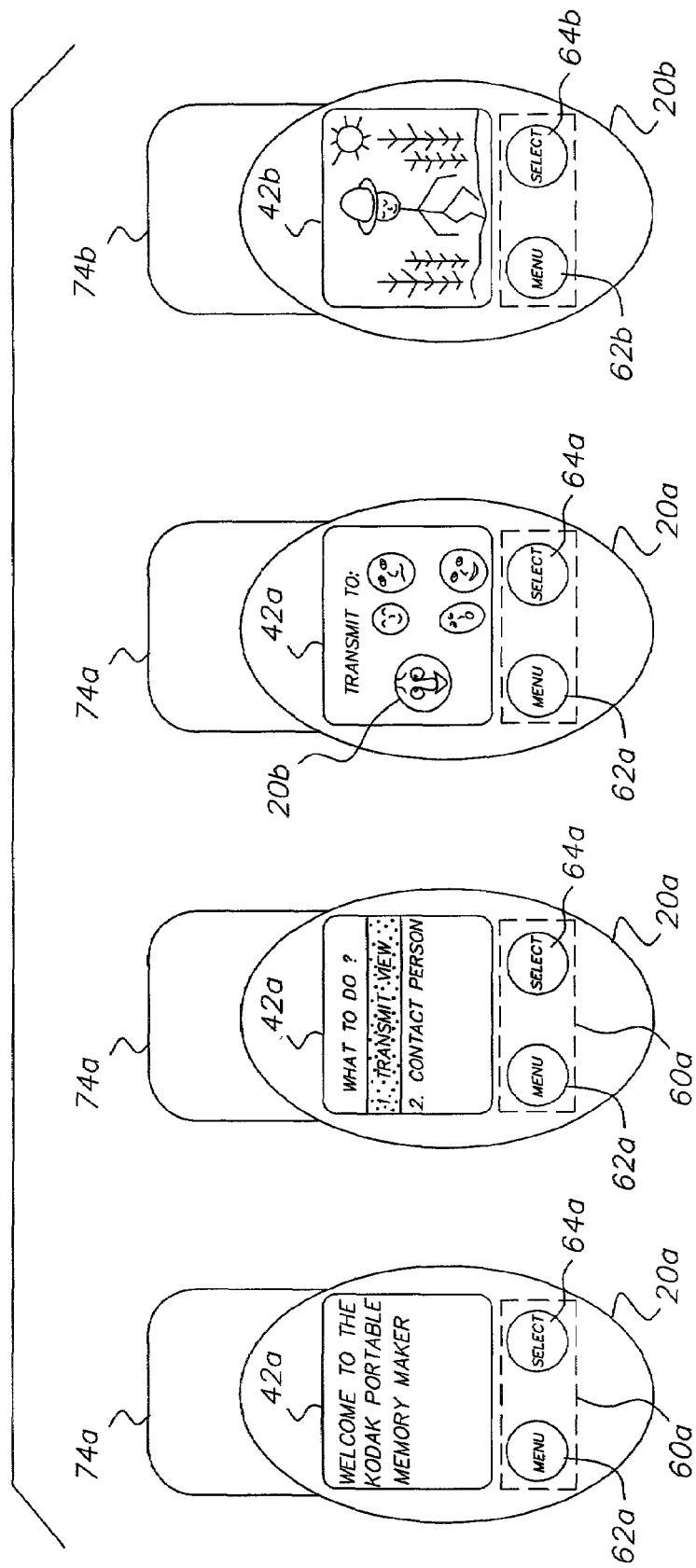
FIG. 6 illustrates the use of one embodiment of a communication device of the present invention to transmit a video signal to other communication devices in an ad hoc network.

Once the ad hoc network is formed, the communication devices are used to communicate between members of a network. (Step 120) FIG. 6 shows one example of this. In this example, the user of communication device 20*a* wishes to share an image of a scene 190 with the users of communication devices 20*b*, 20*c* and 20*d*. To accomplish this, a user of communication device 20*a* uses user interface 60*a* of communication device 20*a* to indicate a desire to transmit a view. Communication device 20*a* responds to this by presenting user identifications for communication devices 20*b*, 20*c* and 20*d* as shown in FIG. 6 as view X. The user can select to transmit the image to one or all of communication devices 20*b*, 20*c*, and 20*d*. In the example shown, the user of communication device 20*a* uses interface 60*a* to designate that the image is to be sent to each of communication devices 20*b*, 20*c* and 20*d*. The image is then transmitted to communication devices 20*b*, 20*c* and 20*d*. In this way, the user of communication device 20*a* confirms that the image will be sent only to the desired members of the network prior to transmission of the image.

Communication devices 20*a*–20*d* can be used to communicate using any number of forms of communication including but not limited to video still picture, text messaging, audio and/or icon or symbolic messaging. For example, files of recorded data such as recorded video files and text files can also be exchanged. In certain embodiments, gaming instructions, actions and other data can be exchanged. A user can use text messaging to vote or otherwise determine possible joint activities, meeting times and/or other matters requiring mutual agreement. For example, someone could send a message asking "Is anyone else hungry for pizza?" User interface 60 can incorporate, for example, a yes/no button that can be used to respond to such inquiries in a rapid and efficient fashion. Where this is done, controller 26 can be adapted to cause video display 42 to present a running count of the responses.

Figure 7:
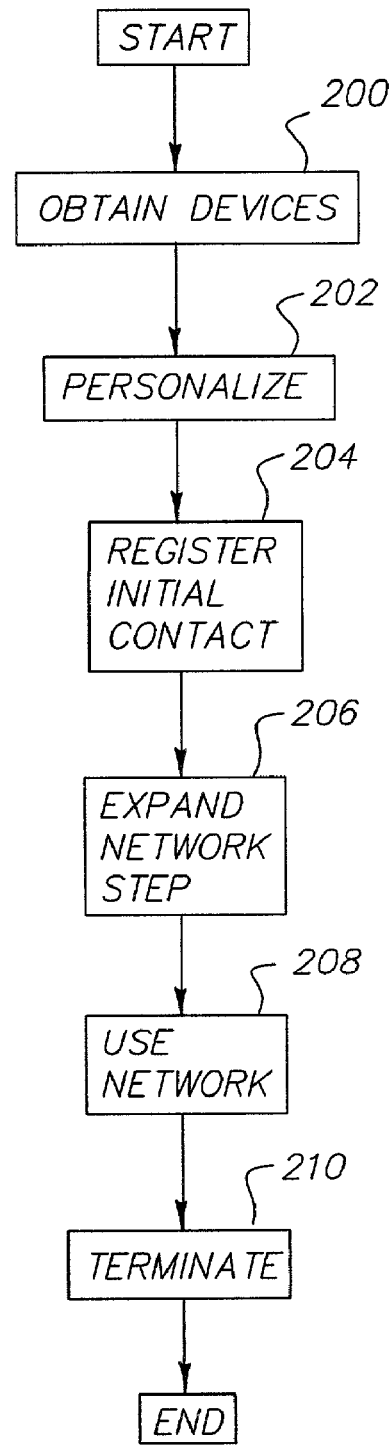
FIG. 7 shows a block diagram of another embodiment of a method for forming and expanding an ad hoc network.
Figure 8:
FIG. 8 shows one embodiment of a communication device display showing a profile entry screen having a first user's preferences entered.

FIG. 7 shows a flow diagram of another method of creating an ad hoc network between a plurality of communication devices such as between communication device 20*a* and 20*d*. As shown in FIG. 7 the steps of obtaining devices (step 200) and personalizing the devices (step 202) are performed. The steps are generally performed in the manner described above. However, in this embodiment, the steps of personalization include the step of entering a user profile. FIG. 8 shows one example of a user profile entry screen that can be used in this embodiment. In this embodiment the profile identifies the name of the user, in this example, Jenny, and identifies her user identification image. The user profile also defines sharing characteristics. In this example, user 1 has designated her user identification image and her preferred sharing method. She has also designated that her e-mail address will be provided to any communication device with which communication device 20*a* has registered contact and that a screen resolution copy of her identification image is to be provided. User 1, however, has not enabled text messaging. Accordingly, other users will not be able to exchange messages with user 1.

User 1 has chosen to allow her to be added to expanded distribution lists. User 1's election to be added to expanded distribution lists enables other users of an ad hoc network to add members to the network without requiring such members to register contact with communication device 20*a*. It will be appreciated that this is an important feature in that it allows an ad hoc network to be formed under circumstances where all members of the network are not in the same place at the same time. User 1 has also elected to save a shared communication and other event related content.

Figure 9:
FIG. 9 shows one embodiment of a communication device display showing a profile entry screen having a second user's preferences entered.

FIG. 9 shows a profile screen used by user 2 to enter a profile on communication device 20*b*. Here too, the profile includes the name of user 2, in this example, Amy. However, user 2 has elected not to share her e-mail address with other users. Accordingly, when a communication device such as communication device 20*a* registers contact with communication device 20*b*, communication device 20*a* will not display Amy's picture. The name Amy will appear. User 2 has elected to permit text messaging but has not elected to allow her to be added to expanded distribution lists. Any person wishing to communicate with Amy using the ad hoc network is required to register contact with communication device 20*b*.

The profile screens shown in FIGS. 8 and 9 also incorporate a user profile designation that permits a user to override the user's initial profile selections. In the embodiment shown, user 1 has elected to allow manual override of her selections. Thus, for example, if user 1 were to elect to attempt to send a text message, such an action would override her initial election not to send or receive text messages. However, if as shown user 1 does not elect to allow her settings to be overridden, then she is foreclosed from sending and receiving text messages until she changes her election.

After profile elections have been made, an initial contact is registered between communication devices 20*a* and 20*b*. This contact forms an ad hoc network between communication devices 20*a* and 20*b*. (step 204). In this example, because communication device 20*b* has not authorized communication device 20*a* to add communication device 20*b* to any expanded distribution lists, communication device 20*a* cannot add members to the ad hoc network. Accordingly, to expand the network to add other communication devices, e.g. communication devices 20*c* and 20*d* to the ad hoc network, communication device 20*b* registers contact with communication devices 20*c* and 20*d*. (step 206) If user 1 had elected to permit communication device 20*b* to be added to extended distribution lists, then communication device 20*a* could also add members to the ad hoc network.

Once established, the ad hoc network can be used as is generally described above to share video, still images, icons, text, symbols and audio messages. (step 208).

After its useful life, the ad hoc network is terminated (step 210). The ad hoc network can terminate at the request of a user of one of the communication devices, at the request of the majority of users, at a predetermined time, or at the end of an event or sequence of events. The conditions giving rise to termination of the ad hoc network can be defined using profiles or by manual control. The ad hoc network can be permanently terminated or it can be temporarily terminated and later re-established. Where the ad hoc network is permanently terminated, information regarding the ad hoc network and its participants will be erased or otherwise discarded by each of the communication devices involved in the network e.g. communication devices 20a–20d and/or any other communication nodes. Where the ad hoc network is temporarily disabled, the network can be re-enabled to permit communications between members of the group. After such communications, the network can again be terminated temporarily. Typically, at least one of the communication devices in the ad hoc network can record information regarding the ad hoc network. This information is stored for example in one of the communication devices, stored by a supplier of rental communication devices, or stored by another service provider such as a telecommunications company, service provider, or other governmental, commercial or non-governmental organization.

Communications that are exchanged using the ad hoc network can also be recorded at the discretion of one or more the members of the ad hoc network. This can be done for example, for the purposes of providing a record of communications made using the network that can be incorporated into an output product for example in a scrapbook, commemorative video presentation or program or audio transcript. In the event that for example, police personnel arrive at a fire scene and establish an ad hoc communication, the fire personnel who later arrive at the scene enjoy the ad hoc network can review the communications that the police personnel have already had regarding the circumstances and can be in a better position to determine how to respond to the situation without causing the police personnel to repeat the communications. Such stored communications can also be used by accessed by users who join or rejoin an ad hoc network. This is particularly useful in situations where one or more members of the network cannot monitor communications because of distractions, loss of signal, equipment failure or for other reasons.

Figure 10:
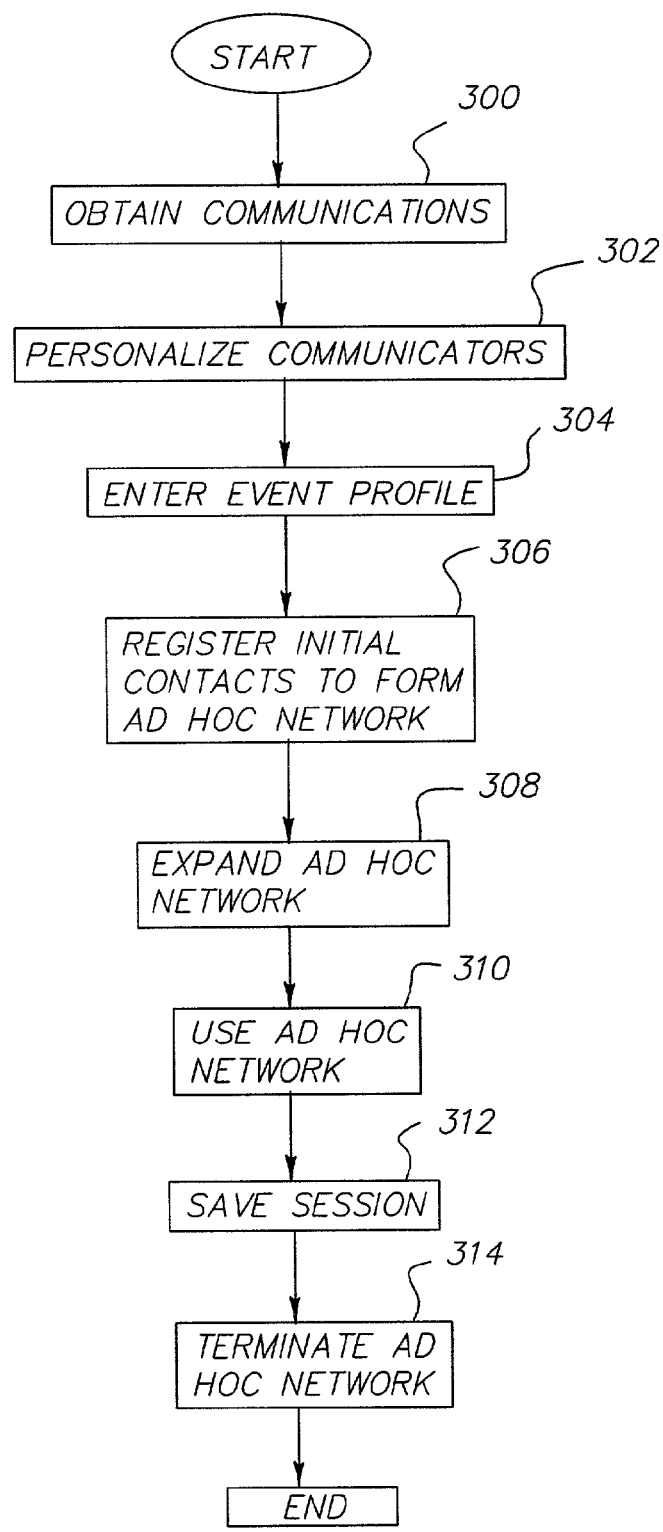
FIG. 10 is a flow diagram of an embodiment of a method for forming an ad hoc network at an event.
Figure 11:
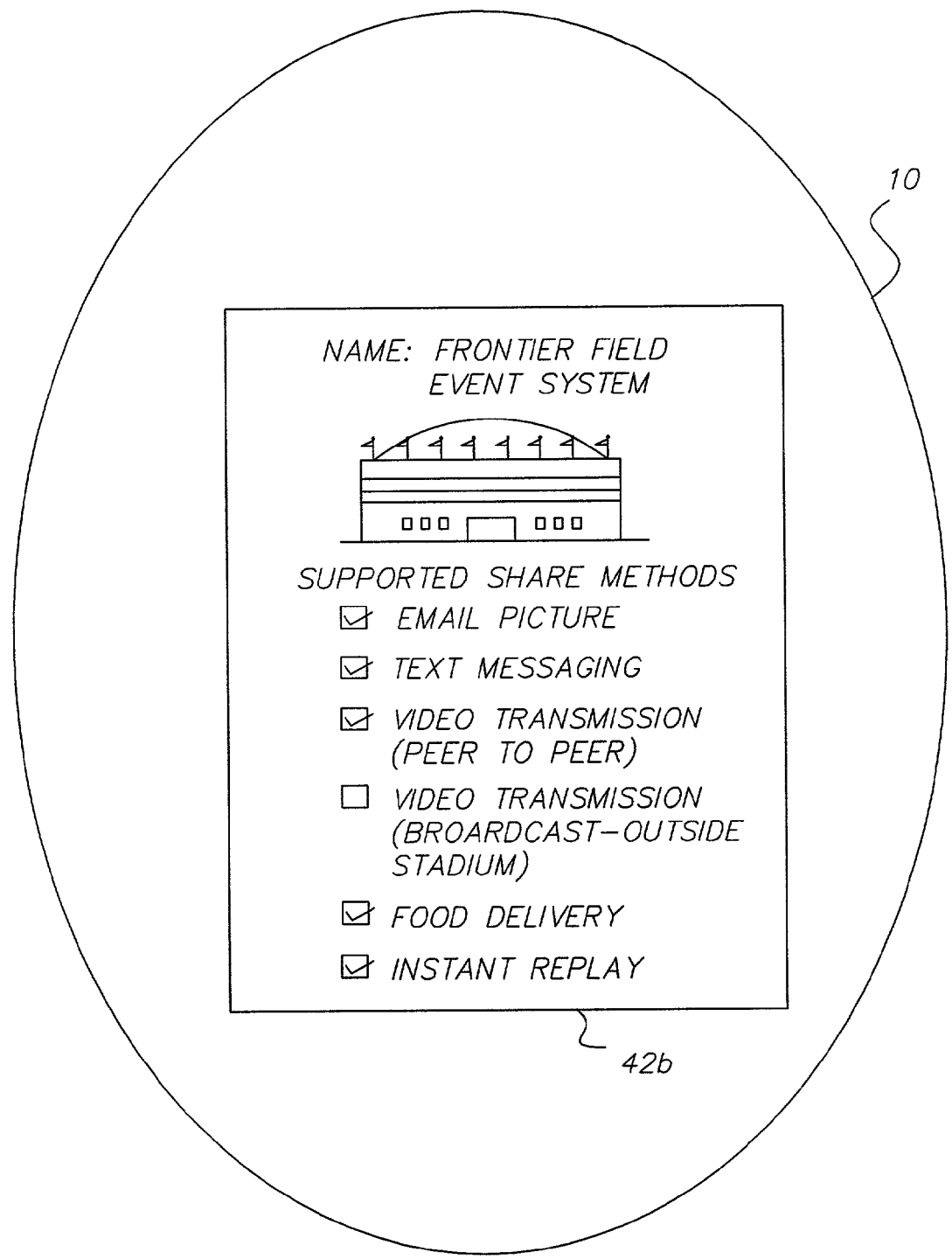
FIG. 11 shows an embodiment of an event profile entry screen.
Figure 12A:
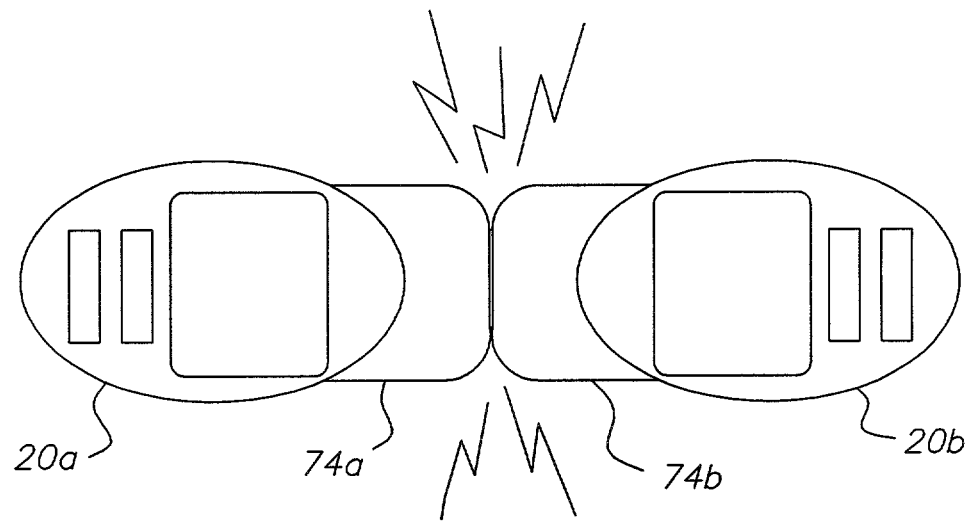
FIG. 12 illustrates another example of the formation of an ad hoc network.
Figure 12B:
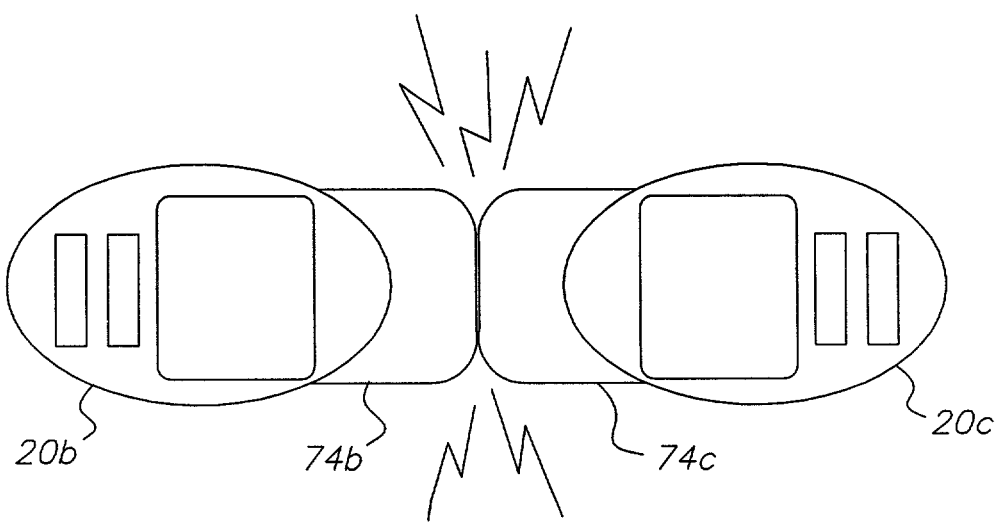
Figure 13:
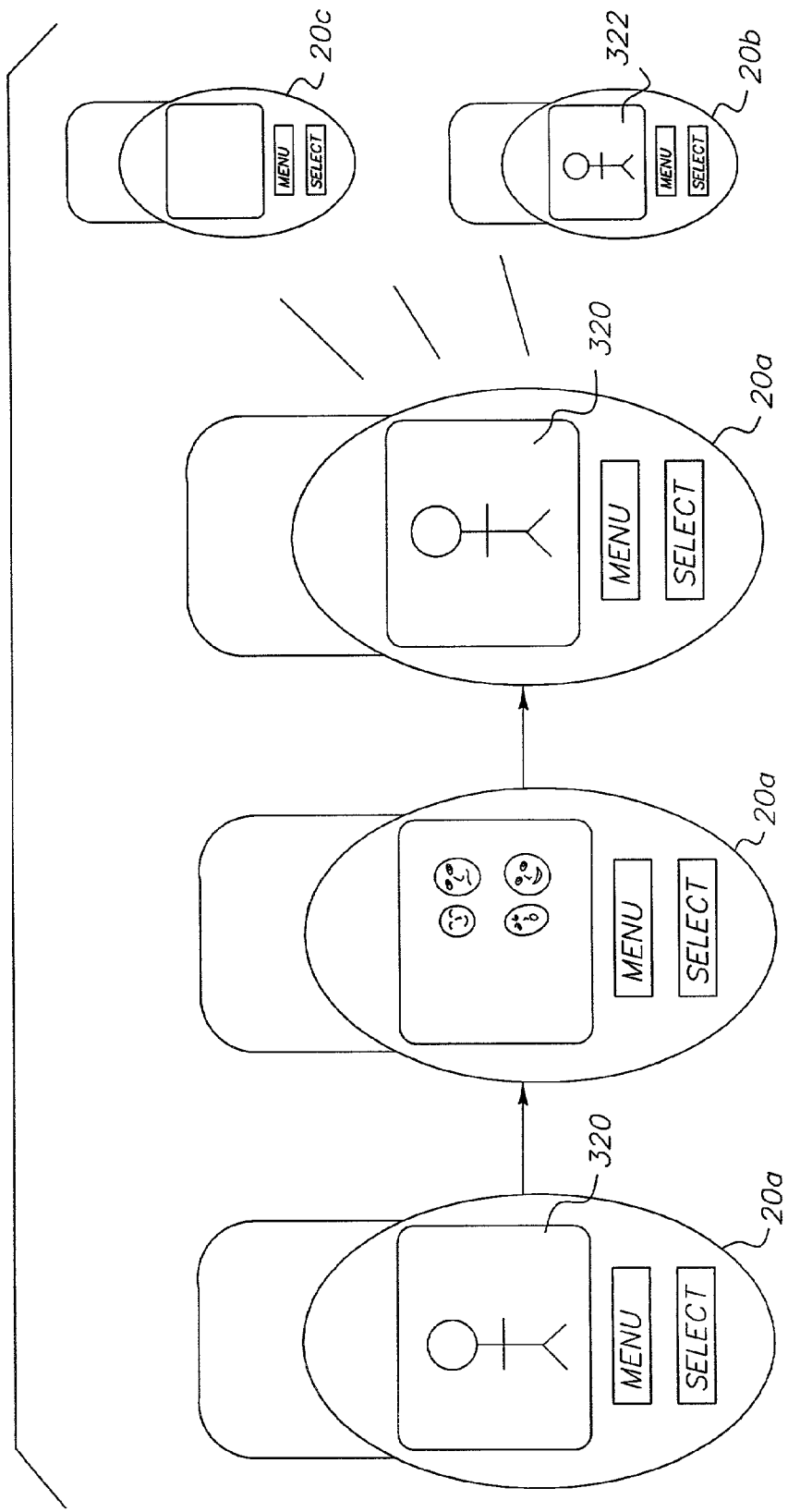
FIG. 13 illustrates sending a video message using the ad hoc network.

FIGS. 10–13 illustrate the use of one embodiment of the present invention as applied in the context of a sporting event such as a soccer game held at a stadium. FIG. 10 shows a method for establishing an ad hoc network at an event. FIG. 11 shows an event profile screen which will be described in greater detail below. FIGS. 12 and 13 illustrate the operation of a set of three communication devices 20a, 20b and 20c used in this embodiment. In this embodiment, three users travel to the stadium to attend the game. User 1 brings communication device 20a to the event while user 2 and user 3 rent, or are provided with, communication devices 20b and 20c upon arriving at the event. (step 300). User profile data is entered into communication devices 20a, 20b, and 20c in the manner described above. (step 302) In this example, user 1 has a user profile that is entered in communication device 20a that indicates that user 1 does not wish to be added to extended distribution lists. User 2 and user 3 have user profiles entered into communication devices 20b and 20c respectively that indicate that user 2 and user 3 wish to be added to extend distribution lists.

An event profile is then entered into each communication device. (step 304) An example of an event profile data entry screen is shown in FIG. 11. The event profile is used to help define capabilities of communication devices 20a–20c that are enable or disabled by a communication means such as node 90 at the stadium that is capable of interacting with communication devices 20a–20c. In the embodiment shown, communication device 20a is a communication device that is brought to the game by user 1. Communication device 20a will therefore have a set of preferences that define the capabilities of communication device 20a. Inactive capabilities of communication device 20a can be activated. For example, where a cellular telephone or other wireless communication provider charges a premium for the use of advanced features such as streaming video communication, user 1 may disable video transmission as a regular feature on communication device 20a because of this additional cost. Recognizing this, the stadium may elect to provide an infrastructure such as an arrangement of intermediary communication sites 90 that will support such communications for no cost as a benefit for those attending the game.

Accordingly, the event profile screen provides the opportunity for user 1 to use video transmission during the event. Alternatively, the stadium may disable this feature during the game to the extent that this feature could be used to transmit images of the game to persons who chose not to attend the game. The user would be alerted to this by an indication on the event profile screen.

The event profile can also be used to allow the each communication device to interact with the event specific services and activities. For example, the event profile can be used to designate that the user of a communication device wishes to use the communication device to order food delivery during the event. This designation can trigger the opening of further profile screens that can be used for example, to input payment information, seat location and other information useful in the delivery of the food. The event profile can also be used to designate communication content that the user of the communication device wishes to receive from communication systems at the stadium. In the example shown in FIG. 12, this information includes instant replay of key events. However, this information can include various other types of data including but not limited to text based play-by-play announcing, player statistics etc. Although not shown, the event profile can also be used to permit the stadium to transmit software and data to a communication device that is executable controller 26 in the communication device. This allows the stadium to provide customized content, features and interfaces to a communication device. The event profile can be pre-programmed into rental communication devices 20b and 20c.

Once the event profile is entered, user 1, user 2 and user 3 establish an ad hoc network established using communication devices 20a, 20b and 20c (step 306). As is shown in FIG. 12a, the first step in forming this network occurs as user 1 and user 2 cause contact surfaces 74a and 74b of communication devices 20a and 20b to touch each other. Devices 20a and 20b register this contact. Each of devices 20a and 20b maintains a distribution list containing addresses associated with communication devices that they have registered contact with. When user 1 wishes to wishes to communicate with other members of the ad hoc network, user 1 puts communication device 20a into an ad hoc communication mode. In this mode, communication device 20a broadcasts all communications to each of the addresses contained in the distribution list maintained by communication device 20a. Similarly, when communication devices 20b is instructed to communicate with other members of the ad hoc network, communication device 20b transmits communications to the addresses contained in the distribution list maintained in communication device 20b.

As is shown in FIG. 12b, the ad hoc network is expanded as user 2 and user 3 bring contact surface 74b into contact with contact surface 74c—(step 308). When this occurs, the address for communication device 20c is added to be distribution list for communication device 20b and the address for communication device 20b is added to the distribution list for communication device 20c. However, the address for communication device 20a is not added to the distribution list for communication device 20c. At this time communication device 20a can be informed that communication device 20b has registered contact with communication device 20c. User 1 can then elect to override the profile entry against being added to extended distribution lists. When this is done to an ad hoc network between communication devices 20a, 20b and 20c is formed and the users of communication devices 20a–20c can use the network to communication—(step 110).

However, user 1 can also elect not to override the profile entry against being added to extended distribution lists. As is shown in FIG. 13, where this is done, communications that are broadcast by communication device 20c will not be presented by communication device 20a. For example, as shown in FIG. 13 display 42c presents a set of user identification images to the user of communication device 20c. Accordingly, user 3 presses the select button 64. This causes display 42 to present identification such as a user name or user identification image to designate each person in the ad hoc network. User 3 then presses the select button 64, which indicates that the image is to be sent to every indicated person. User 3 then points communication device 20c toward the subject of the image and presses the select button again which causes a live preview image 320 of the scene to be displayed on display 42c of communication device 20c. When the scene is properly composed, user 3 can again press the select button to cause a matching image 322 of the scene to be transmitted by transceiver 22c and displayed on display screen 42b of communication device 20b. However, the transmitted image of scene 320 is not presented upon display screen 42a of communication device 20a.

Other forms of communication such as audio and text messaging are transmitted and received in the same fashion with, communications from communication device 20c being exchanged only with communication device 20b and not with communication device 20a. Similarly telecommunications transmitted by communication device 20a travel only to communication device 20b and not to communication device 20c.

Optionally, the users of the network can elect to same the communication exchanged during a session of use of the ad hoc network—(step 312).

The network can be terminated at the end of the event or it can be terminated by user selection—(step 312). In the case of user 2 and user 3 who have rented the device, termination of the network causes user preferences to be erased thus ensuring the privacy of the previous user when the device is next rented. If the network has not been terminated when the device is returned the rental counter, the rental person terminates the network. Upon leaving the event location, any additional features and any limitations that are placed upon personally owned devices such as communication device 20a by the event are removed. Upon termination of the network, saved and other communication can be stored, shared or incorporated into an output.

Multiple simultaneously active ad hoc communication networks can be formed. For example, a group traveling to a soccer field can form a first network between communication devices 20a, 20b, and 20c as described above. Other communication networks can also be established that include at least one of communication devices 20a, 20b and/or 20c. These networks can be formed in the same fashion. For example, a user of communication device 20a can choose to obtain additional game content by using the methods described above to establish a network with a communication device operated by the stadium. Similarly, a user can identify herself as a fan of a particular player by registering contact with a fan club communication device located at the stadium. This allows a network to be formed between fans of that player. This permits the user of communication device 20a and other fans of the player to further their interest. The player's fan club database can provide content to such a network. Further, the event itself can provide content to the communication devices that have formed a network through the fan club communication device. Using the methods, systems and communication devices described herein, groups can also be joined together to form larger groups such as where to smaller groups have common interests.

An ad hoc network can also be established between a communication device such as communication device 20b and a communication device operated by vendors and suppliers at the stadium. This allows the user to privately and directly order event related goods and services and to otherwise interact with such vendors.

Where multiple communication networks are enabled, user interface 60 can include a channel selector allowing the user to conveniently select between networks. The selector can be a job dial or other convenient indicator. Preferably, where multiple networks are enabled, the communication device will display images of the user identification images or user identification of the members of the network to provide visual assurance as to the recipients of communications transmitted by the communication device.

In various embodiments described above, communication devices have been shown as comprising or taking the form of existing communication devices such as personal digital assistants and cellular telephone. Such devices currently have a predefined set of functions and communicate in a well-established fashion. As is noted above, devices of this type can be adapted to operate in a second mode of operation for communication using the ad hoc network. Various components of such devices can be used to support communication in both modes. For example, a conventional cellular telephone antenna can be used as a contact surface, or a conventional transceiver adapted for use in cellular telephone communications can be adapted to operate in a mode wherein it permits detection of contact between a telephone antenna and a contact surface of another device. User interface 60 can be used to instruct controller 26 of a communication device 20 as to which mode of operation is to be used.

In addition, various devices such as cellular telephones and personal digital assistants such as the Visor personal digital assistant sold by Handspring Corp. Mountain View, Calif., U.S.A. are adapted with modular input ports that permit modules that add functionality to the device to be easily added to and removed from the device. A communication device as described herein can comprise any arrangement of an existing device such as a Visor and a modular attachment providing components or software necessary to adapt the existing device to operate in the manner described herein.

The invention has been described in detail with particular reference to certain preferred embodiments thereof, but it will be understood that variations and modifications can be effected within the spirit and scope of the invention.

PARTS LIST 10 communication system
20a communication device
20b communication device
20c communication device
20d communication device
20n communication device
22 radio transceiver
24 antenna
26 controller
28 video communication system
30 lens system
32 image sensor
34 image processor
36 memory
40 display driver
42 video display
50 audio system
52 microphone
54 A/D converter
56 speaker
60 user interface
62 menu button
64 select button
70 contact detection system
72 contact surface
74 contact circuit
90 intermediary communication site
100 method for forming ad hoc network
110 obtain communication devices step
114 personalize communication devices step
118 register contact step
120 use ad hoc network step
130 welcome message
132 instruction message
134 message 1
135 preview image of user
136 message 2
137 user identification image
138 message 3
140 message 4
142 message 5
150 first feedback image
152 progress indicator
154 image
200 obtain devices step
202 personalize devices step
204 register initial contact step
206 expand network step
208 communicate using network step
210 terminate network step
300 obtain devices step
302 personalize communication devices step
304 enter event profile step
306 register contact step
308 expand network step
310 use network
312 terminate network step
320 image of scene
322 matching image

What is claimed is:

1. A communication device comprising:
   a transceiver adapted to send and receive wireless communication signals;
   a contact surface;
   a contact circuit adapted to detect contact of another communication device with said contact surface; and
   a controller adapted to enable communication only between the communication device and detected communication devices; and
   to determine a network identification signal in response to contact with a plurality of other communication devises; and
   to share the network identification signal with said other communication devices; and
   to use the network identification signal to identify communications to be limited to said other communication devices.

2. The communication device of claim 1 wherein the contact surface is electrically conductive and the contact circuit is adapted to detect an electrical connection between the contact surface and an electrically conductive contact surface of the other communication devices.

3. The communication device of claim 1, wherein said transceiver is operable in a contact registration mode wherein the transceiver is adapted to compromise the contact circuit and an ad hoc network communication mode.

4. The communication device of claim 3, wherein said transceiver is operable to communicate in a manner that does not use the ad hoc communication mode.

5. The communication device of claim 1, further comprising a user input adapted to receive a user profile comprising at least one of a network identification signal, a user name, a user image, sharing characteristics, a preferred sharing method, or an election to be added to expanded distribution lists, an election to save shared communications, or election to save other event related content.

6. The communication device of claim 5, wherein the user profile comprises a network identification signal sharing authorization defining circumstances under which said other communication device can exchange the network identification signal of the communication device with still another communication device and wherein the controller is adapted to cause the network identification code authorization to be shared whenever the network identification signal transmitted.

7. The communication device of claim 1, wherein the controller is adapted to receive identification codes from each detected communication device.

8. The communication device of claim 7, wherein each identification code has identification code sharing privilege associated therewith and said controller is adapted to share the identification codes of other communication devices only in accordance with the identification code sharing privileges.

9. The communication device of claim 7, further comprising a user input adapted to receive a user profile comprising at least one of an identification code, a user identification signal, a user image sharing characteristics, a preferred sharing method, an election to be added to extended distribution lists, an election to save shared communications, or an election to save other event related content.

10. The communication device of claim 9, wherein said profile includes a user identification signal and wherein said controller is adapted to share said user identification signal whenever said controller shares the device identification code.

11. The communication device of claim 9, further comprising an output for presenting signals to the user of the device wherein said controller is adapted to receive a user identification signal from detected communication devices and said controller is adapted cause the output to generate a signal in accordance with the user identification signal.

12. The communication device of claim 11, wherein the identification signal comprises an image and the output comprises a display to present identification images.

13. The communication device of claim 12, wherein said controller causes the display to present each identification image of each detected communication devices.

14. The communication device of claim 12, wherein said communication device comprises an input and an output for communication between the user of the communication device and each user of the at least one other communication device and said communication device presents the identification image of each detected communication device.

15. The communication device of claim 14, further comprising a control input permitting the user to select from among the detected communication devices wherein said controller is adapted to cause the transceiver to transmit and receive communications only with the selected communication devices.

16. The communication device of claim 15, wherein the controller is further adapted to cause the output to present the identification image associated with each of the selected communication devices.

17. The communication device of claim 13, further comprising a camera to capture an image and the controller uses the captured image as an identification image.

18. The communication device of claim 1, wherein the contact surface comprises an antenna.

19. The communication device of claim 1 further comprising a channel selector wherein the controller is adapted to associate detected communication devices in groups with each group associated with a channel.

20. The communication device of claim 19, wherein the controller is adapted to detect the position of the channel selector and to communicate with groups of detected communication devices associated with the channel indicated by a position of the channel selector.

21. A communication system comprising:
    at least two communication devices each communication device having,
    a transceiver adapted to send and receive information using radio frequency signals said transceiver having an address;
    a camera to capture images;
    a display adapted to display images;
    a contact surface;
    a contact circuit adapted to detect temporary physical contact between the contact surface of the communication device and contact surface of another of the at least two communication devices; and
    a controller adapted to determine an address list containing the address of each transceiver of each detected communication device, wherein each controller is operable for communicating only with communication devices having an address on the address list after the detected temporary contact.

22. The communication system of claim 21, wherein the controller further exchanges an encryption code with other communication devices when contact is detected and encrypts all communications between the communication devices using the encryption code.

23. The communication system of claim 21, wherein at least one communication device has a user interface.

24. The communication system of claim 23, wherein the user interface permits the user to enter a user profile identifying whether to allow the address of the communication device to be shared by other communication devices.

25. The communication system of claim 23, wherein the user interface permits the user to enter event profile information defining information for use in performing functions that are enabled only while the communication device is in communication with another communication device that is located at an event.

26. The communication system of claim 25, wherein the event profile information determines the functions of the communication device that are enabled during an event.

27. The communication system of claim 22, wherein the communication devices are adapted to exchange communications including stored files.

28. The communication system of claim 21, wherein the communication devices are adapted to exchange data that include video game communication and related data.

29. A method for forming a wireless communication network between at least two communication devices each having a contact surface, the method comprising the steps of:
    moving the contact surface of one communication device into contact with the contact surface of at least one other communication device;
    registering contact between the contact surfaces; and,
    separating the devices, limiting communication in at least one mode to communication between separate communication devices having previously registered contact.

30. The method of claim 29, wherein the step of limiting communication in at least one mode to communication between contacted devices comprises the steps of determining a user identification signal and the step of limiting communication in at least one mode to communication between contacted devices comprises only sending and receiving communications having the user identification signal.

31. The method of claim 30, further comprising the step of entering a profile containing a user identification signal.

32. A method for forming a wireless communication network between at least two communication devices each having a contact surface, the method comprising the steps of:
    moving the contact surface of one communication device into contact with the contact surface of at least one other communication device;
    registering contact between the contact surfaces; and
    limiting communication in at least one mode to communication between communication devices having registered contact,
    wherein the step of limiting communication in at least one mode to communication between contacted devices comprises the steps of determining a user identification signal and the step of limiting communication in at least one mode to communication between contacted devices comprises only sending and receiving communications having the user identification signal further comprising the steps of entering a sharing profile into a first communication device and using the sharing profile to limit the distribution of the user identification signal between a detected communication device and all other communication devices that contact the detected communication device without contacting the first communication device.

33. The method of claim 29, wherein each communication device comprises a display and an input for receiving a user identification signal and further comprising the steps of entering a user identification signal and displaying identification signals associated with detected communication devices when the communication device is operated to communicate with detected devices.

34. The method of claim 29, wherein at least one communication device is capable of communicating in at least two modes and at least one mode permits communication between any of the communication devices having registered contact, wherein the method further comprises the step of selecting between modes.

35. The method of claim 29, further comprising the step of entering a device profile defining information for use in performing functions that the communication device is to enable only during an event and enabling the communication device to exercise those capabilities during the event.

36. The method of claim 29, further comprising the steps of transmitting a signal from one of the registered communication devices to more than one other registered communication device, said signal having an identification code.

37. The method of claim 29, wherein at least one of the communication devices transmits information to the network.

38. The method of claim 29, wherein the step of providing communication devices comprises the step of renting the communication devices.

39. The method of claim 29, further comprising the step of storing communications made using the network.

40. The method of claim 39, further comprising the step of incorporating communications made using the network in to an output.

41. The method of claim 29, further comprising the steps temporarily terminating network and restarting the network.

42. The method of claim 29, further comprising the step of terminating the network.

43. The method of claim 29, further comprising the step of monitoring the usage of the communication device and adjusting the profile based upon the monitored usage.

* * * * *

UNITED STATES PATENT AND TRADEMARK OFFICE
CERTIFICATE OF CORRECTION

| | |
|---|---|
| PATENT NO. | : 7,027,836 B2 |
| APPLICATION NO. | : 10/238134 |
| DATED | : April 11, 2006 |
| INVENTOR(S) | : Carolyn A. Zacks et al. |

Page 1 of 1

It is certified that error appears in the above-identified patent and that said Letters Patent is hereby corrected as shown below:

| | |
|---|---|
| Column 18, line 19 | replace "two" with --three-- |
| Column 18, line 27 | insert --only-- after "communication" and before "between" |

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,027,836 B2  Page 1 of 1
APPLICATION NO. : 10/238134
DATED : April 11, 2006
INVENTOR(S) : Carolyn A. Zacks et al.

It is certified that error appears in the above-identified patent and that said Letters Patent is hereby corrected as shown below:

Column 16, Claim 1, line 1     insert --physical-- after "detect" and before "contact"

Signed and Sealed this

Fourth Day of November, 2008

JON W. DUDAS
*Director of the United States Patent and Trademark Office*